Patented May 13, 1941

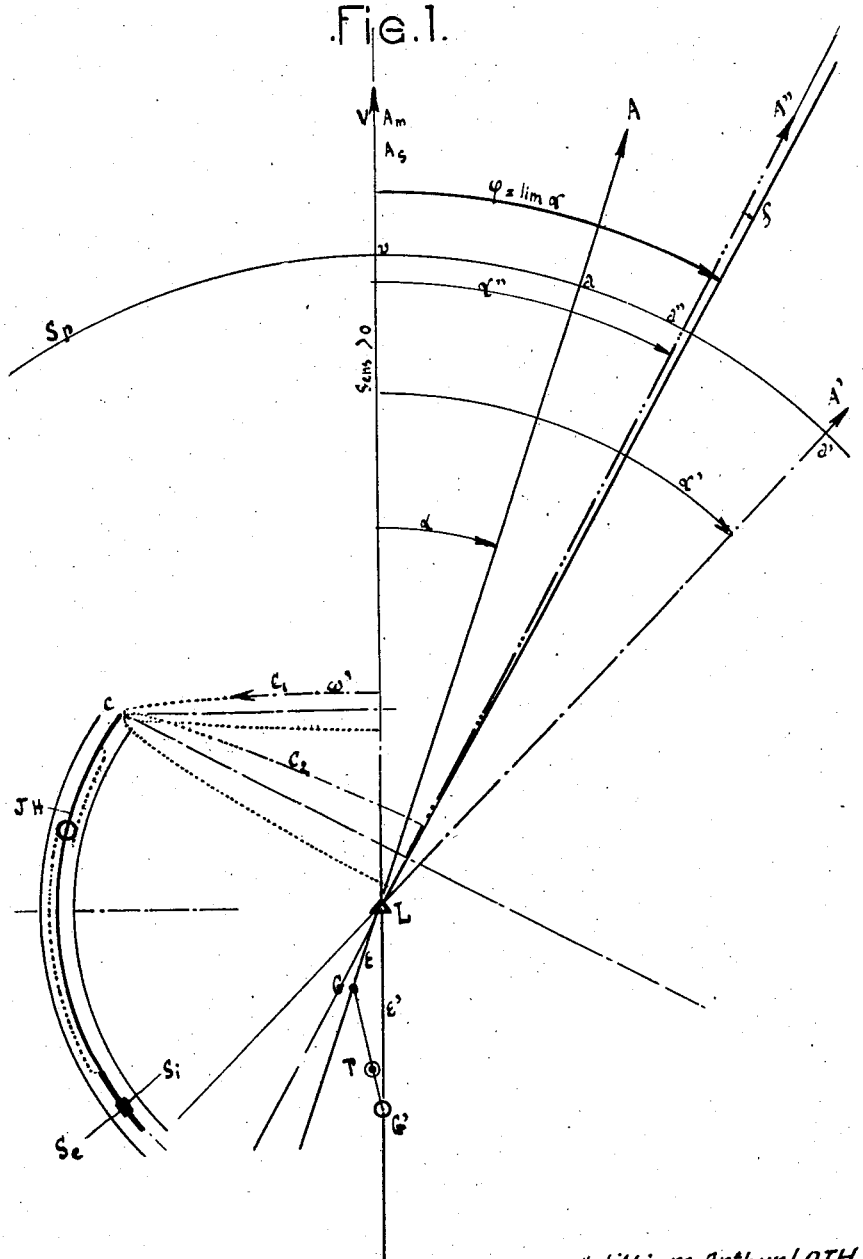

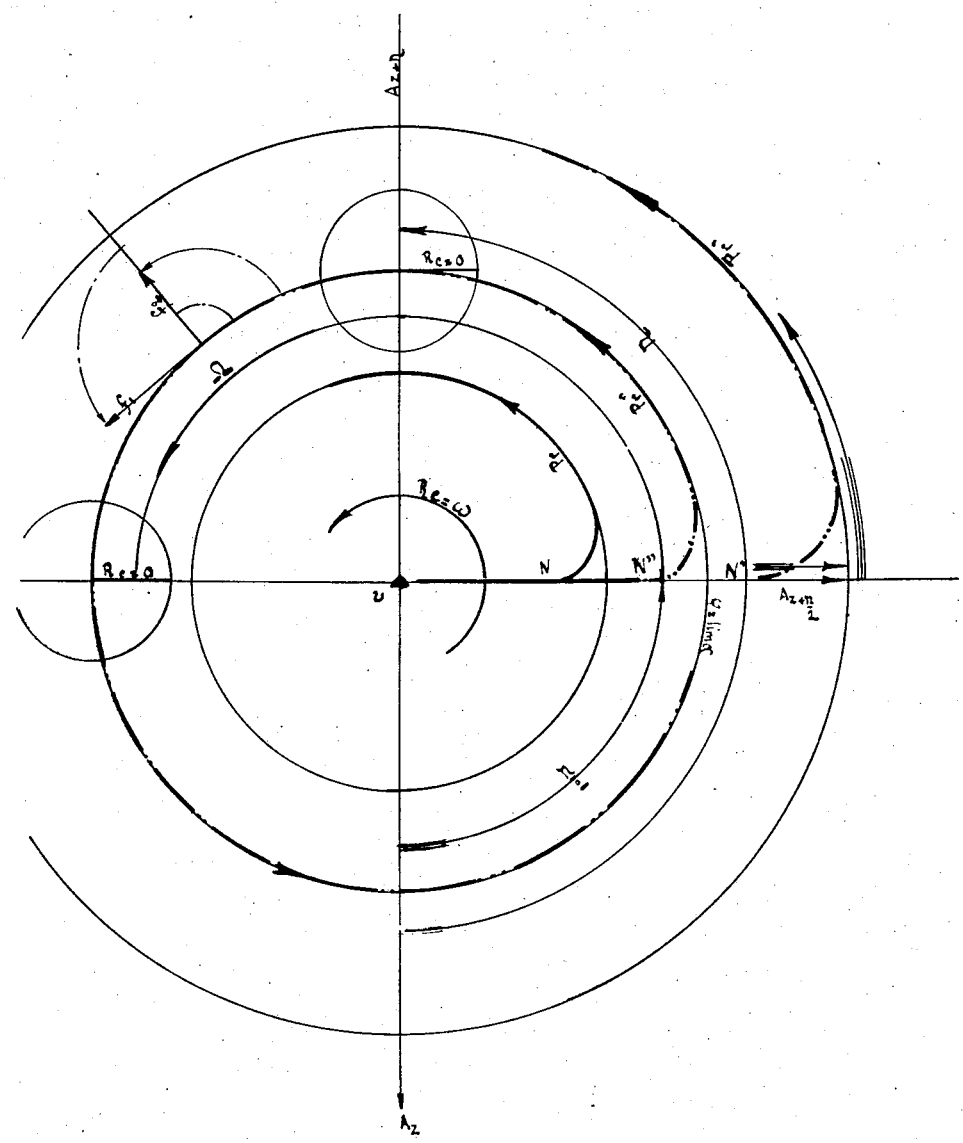

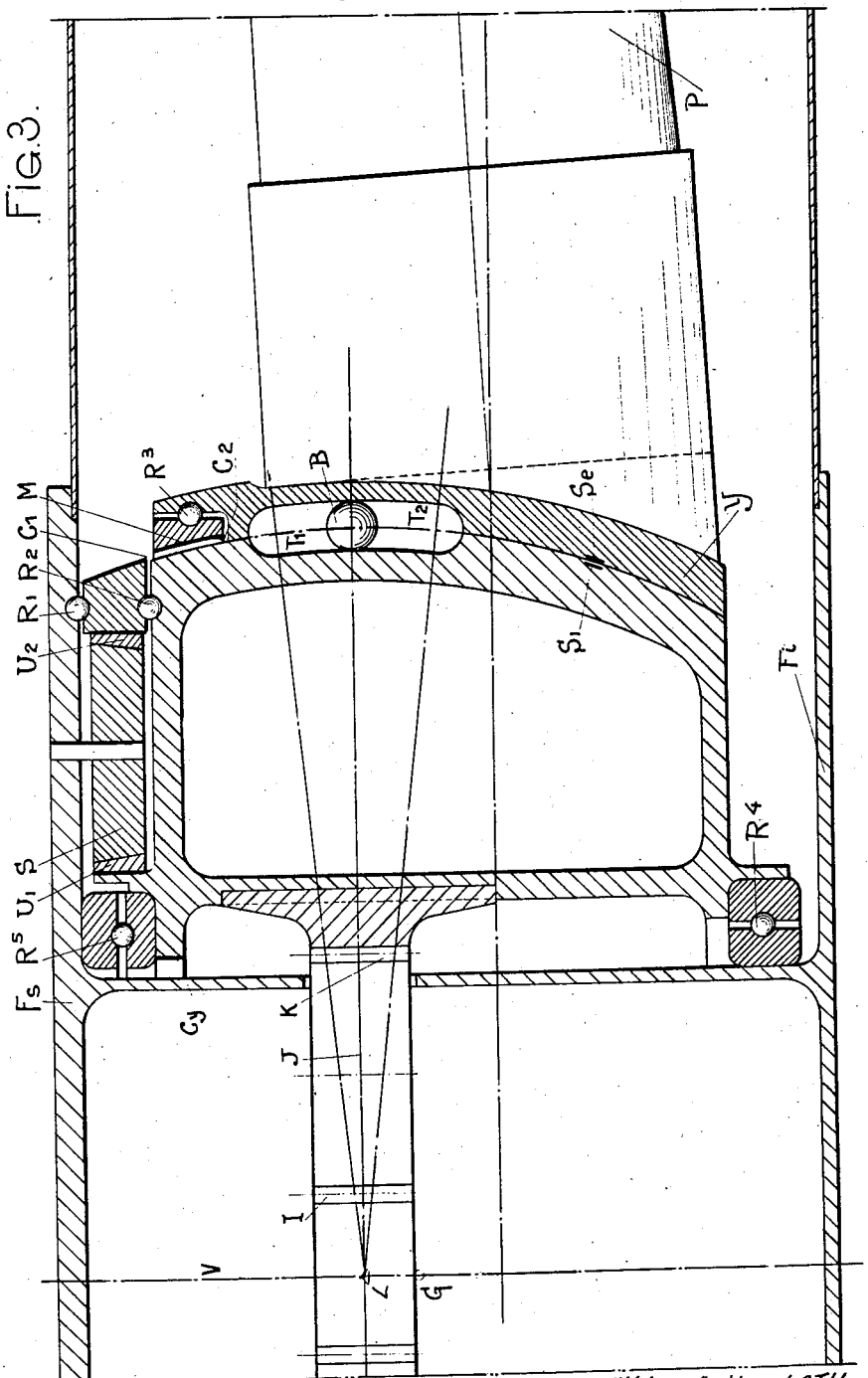

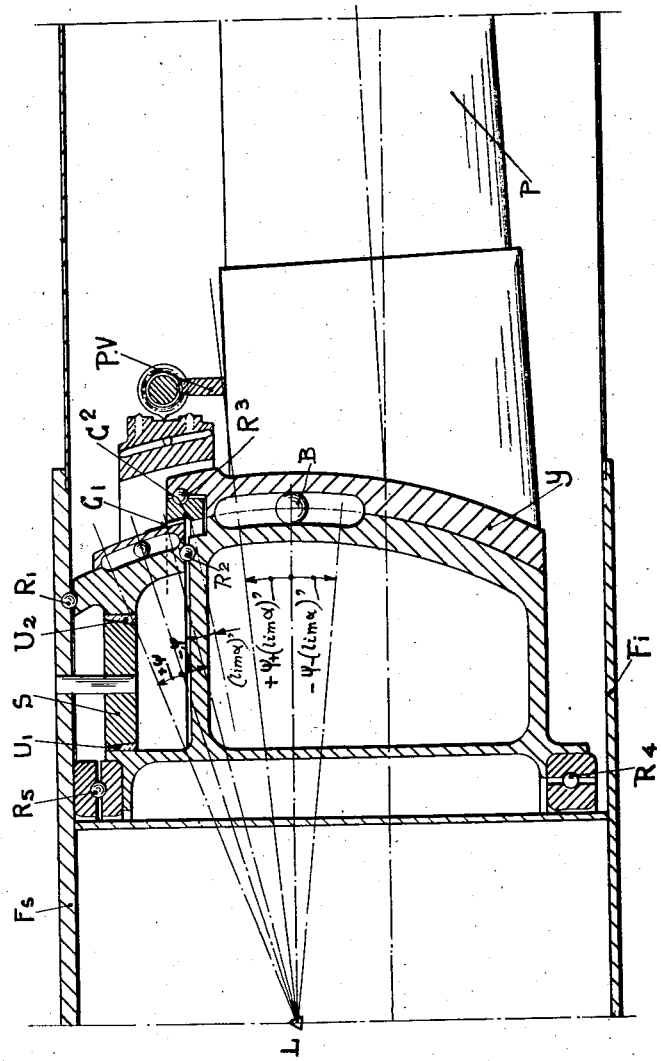

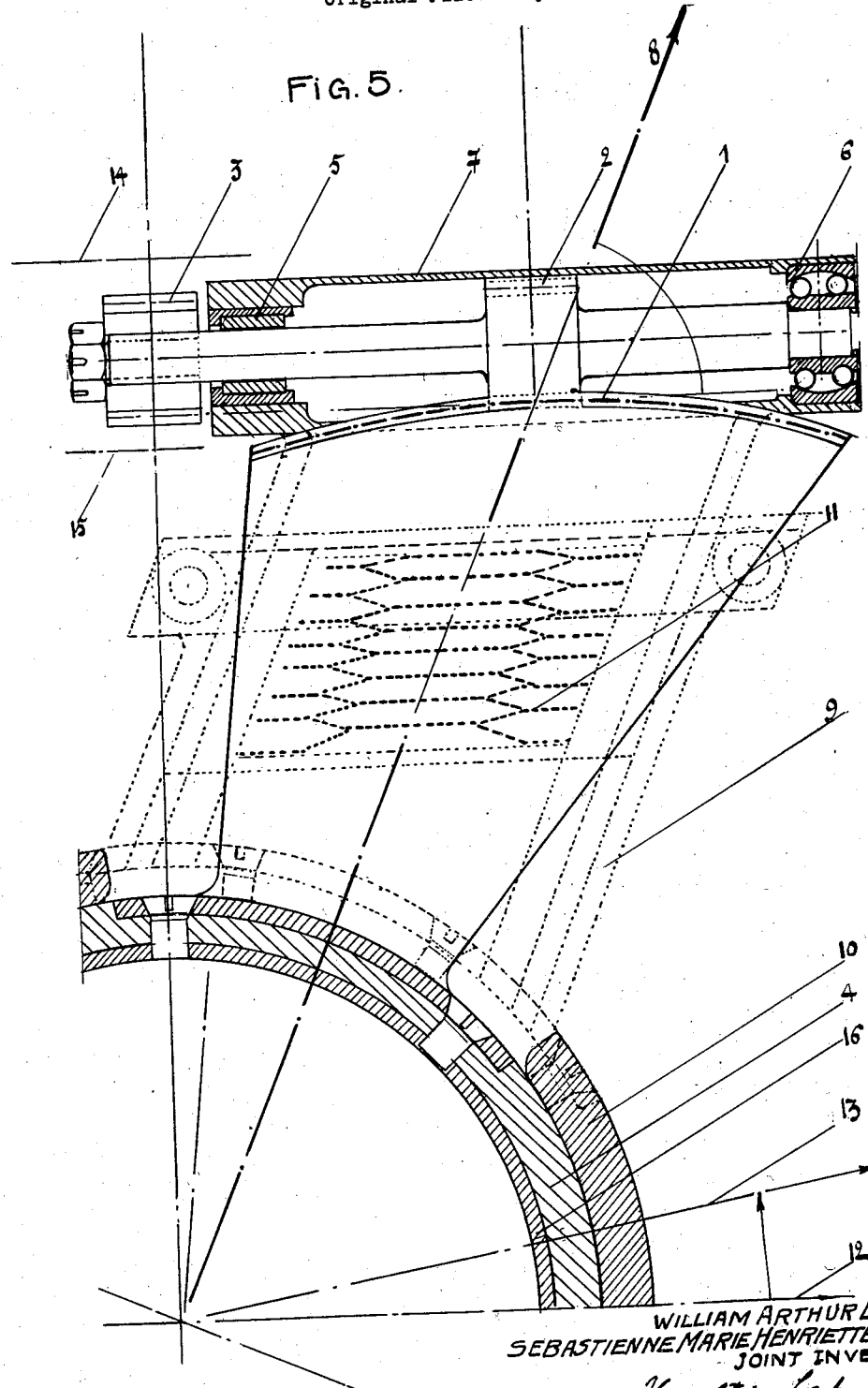

2,241,786

UNITED STATES PATENT OFFICE 2,241,786

STABILIZATION OF ROTATING LIFTING SYSTEMS

William Arthur Loth and Sébastienne Marie Henriette Guyot, Paris, France

Application July 28, 1937, Serial No. 156,064. Renewed November 7, 1939. In France July 31, 1936

9 Claims. (Cl. 244—17)

The present invention relates to means for effecting stabilisation of aircraft and particularly of aircraft based on lifting systems which are mobile relatively to the aircraft or on systems which are at the same time of the lifting and propelling types and mobile relatively to said craft.

The main object of our invention is to produce stabilization, which consists in making the control of an aircraft such as a helicopter independent of the accelerations and variations of density of the fluid medium in which it operates.

It is also an object to overcome every disturbing action without the intervention of the pilot and in such a manner that the stator maintains its speed and initial direction (if the average speed of the wind remains constant).

In the accompanying drawings forming part hereof,

Fig. 1 is a geometrical diagram of certain functions and relative movements of parts of apparatus involving the invention;

Fig. 2 is another diagram indicating movements and relations of certain portions of such apparatus;

Fig. 3 is a section of part of an apparatus embodying the invention in practical form;

Fig. 4 is a modification or elaboration of the same;

Fig. 5 is a fragmentary section of part of the apparatus of Fig. 4.

Throughout the views, the same references indicate the same or like parts.

It is to be particularly noted that in a fluid medium practically isolated from the energy point of view, the elementary actions of disturbances at a single point in space are reducible to alternative actions, of which the frequency $r$ decreases in inverse ratio to their magnitude A.

The principle of an absolute stabilisation will consist not only in limiting the elementary action of the disturbance in such a manner that it can be compensated by the necessarily limited forces at the disposal of the aircraft, but also in integrating the elementary (alternative) actions of the disturbances in such a manner that the resultant movement (displacement and inclination) of the stator is nil and its oscillation on its trajectory and its initial direction is at a minimum.

The present invention in essence includes every process of stabilisation which applies the new general principle just stated, and in particular every process which consists in the creation of a relative movement, in accordance with the principle stated, between the lifting system, or propelling system, or lifting and auto-propelling system in motion in relation to the aircraft on the one hand and the driven system on the other hand, this relative movement including primarily— degree of liberty in the connection of the two systems, permitting this relative movement, and also the mechanism determining the relative movement above mentioned.

By way of example only there will be described such a relative stabilising movement, which will be called movement of "artificial precession;" this movement involves— a new method of connection for aircraft between the lifting or propelling or lifting and auto-propelling system in movement relatively to the aircraft and the driven system characterised by its being prompt in action and moreover either adapted for positive rotation therewith or not, and includes— a mechanism determining the movement of artificial precession,

The nature of the connection between the lifting or lifting and auto-propelling system and the driven system of the aircraft will first be studied.

Every aircraft which has to carry on flight in a fixed position will necessarily have a dynamic lifter and auto-propeller, exhibiting movement in relation to the fuselage and can therefore be considered from the mechanical point of view as being formed by the connection of two systems, namely (a) a gyroscopical system in movement in relation to the fuselage, especially in sustained rotation (screw, rotor).

(b) a non-gyroscopical system, without sustained rotation (fuselage, stator).

The connection between these two systems can be effected at— two points (axial connection).

or at one point (punctual connection).

In the method of axial connection, the axis of sustained rotation of the rotor is caused permanently to coincide with the axis of the stator. In the method of point connection, a single point of the axis of sustained rotation of the rotor is caused to coincide with a fixed point of the stator, which allows of a relative conical movement of the axis of the rotor relatively to the stator.

This point connection can also be positively arranged for synchronous rotation at all times not only with respect to the desired connection between the number of revolutions of the motor and that of the rotor, but may have this same relation during each revolution.

With these advantages this method of connection reduces the energy necessary for the maintenance of the movement of artificial precession to a minimum, and allows of a gyroscopic freeing of the rotor and the stator; and a limitation owing to the gyroscopic effect of the energy of disturbance introduced in the rotor.

The mechanism of the movement of "artificial precession" will now be studied, and such may be defined by stating that the axis of sustained rotation of the rotor describes in relation to the stator a cone of revolution whose summit coincides with the centre of point connection, preferably positively arranged for synchronous rotation, whose axis is fixed relatively to the stator or variable at will and whose amplitude is either adjustable or fixed, this movement being effected in a direction proper for the stabilisation and at the suitable speed, which is or is not adjustable during flight.

Herein certain geometrical expressions such as "opening of a cone," "circle" etc., will be used to express movements, circular paths, peripheral parts or motions, etc.

Every kinematic device including this relative movement can be used, especially that shown diagrammatically in Figures 1 and 2, which directly determines the drive of a receiving circle connected to the axis of the rotor and defining its position owing to a motor circle connected to the axis of the stator.

Every source of energy can be utilised; for example, the motor circle can be driven by the motor of the rotor or any special motor.

The mechanism controlling the movement of "artificial precession" intervenes when the axis of the rotor is affected by any external or internal disturbance, in relation to the stator, which causes a limiting inclination fixed at will and preferably equal to the opening of the cone of artificial precession. For example, the mechanism is engaged when the inclination of the rotor brings the receiving circle in contact with the motor circle.

Figs. 1 and 2 show such a movement diagrammatically. Fig. 1 is a vertical plan passing through the centre of connection L of the stator and the rotor.

Fig. 2 is the horizontal projection on a horizontal plan tangential at $v$ to the sphere of reference $S_p$ of centre L.

The movement of the rotor having a fixed point L will be defined if at any moment, when the movement of its axis, is known, this movement being definable by the curve C which describes the intersection $a$ of the axis A with a sphere of reference $S_p$ of centre L, and when the absolute rotation about this axis is known, $R_t$, which can be resolved as follows:

$R_t = R_c$ plus $R_e$   $R_t$ = absolute rotation.
$R_c$ = rotation of the solid coincident.
$R_e$ = sustained rotation of the motor = $\omega$ Let $\varphi$ be the amplitude of the movement, or semi-opening of the cone of artificial precession and $\Omega$ the speed of artificial precession.

It may be seen that the axis A of the rotor can oscillate about the axis $A_s$ of the stator (coinciding in flight to the fixed point with the initial vertical V). Let L be their point of connection, and G' the centre of gravity of the stator, below L at a distance $LG' = \Sigma' < 0$, then the movement of the motor axis $A_m$ which coincides with $A_s$ is transmitted, as has been seen, to the axis A of the rotor, by means of a positively rotated point joint. Let $S_i$ be the internal sphere of the positively rotated boss, of centre L, one diameter of which coincides with the motor axis, driven by a reducing device with a given reduction ratio, and $S_e$ the external sphere of the positively rotated boss, of centre L, connected to the rotor by three points which are movable and forced to ensure the condition of positive synchronism of rotation, also $C_1$ the motor circle of the movement of precession, belonging to the same sphere as $S_i$, having its plane perpendicular to the axis $A_s$; driven by the motor, either directly or through $S_i$, at the speed $\omega'$; and $C_2$ is the receiving circle of the movement of precession belonging to the same sphere as $S_e$, having its plane perpendicular to the axis A of the rotor, but in free rotation by relation to the sustained rotation of the rotor.

The circle $C_2$ comes into contact with the circle $C_1$, when the axis A of the rotor is inclined by the angle $\varphi$. When the axis A of the rotor describes the cone of opening $\varphi$ its direction is determined by the position of the point of contact C of the circle $C_2$ on circle $C_1$.

The progress of the movement is now noted.

Let $\alpha$ be the inclination at a given instant of the axis A of the rotor on the axis $A_s$, $f$ a small angle.

The progress may then occur as follows:

For small inclinations:

$\alpha < \varphi - f$ equals no contact, and no drive.

As soon as the inclination exceeds a certain value $\varphi - f < \alpha < \varphi$ the contact is progressively established. The circle $C_2$ tends to roll on $C_1$, the point of contact $c$ first resting fixed in space. The progressive drive is then noted.

When the inclination reaches lim $\alpha = \varphi$ intense drive results.

The locking of the circle $C_2$ on $C_1$ becomes such that $C_1$ may drive the point of contact $c$ at its own speed $\omega'$; the axis A describing the cone of opening $\varphi$ at the speed $\Omega = \omega'$, the progress of the drive can be effected practically by making the circle $C_2$ belong to a surface of revolutions of logarithmic meridian.

For the purpose of demonstration, it is to be noted that under the influence of a disturbance which would tend to incline the axis of the rotor A in the azimuth $A_z$, if it had not the sustained rotation $\bar{\omega}$, the point $a$ (which defines the position of the axis A of the rotor) describes the arc $N''$ in the azimuth $A_z$ plus N/2 (displaced by N/2 in advance of $A_z$ in relation to the direction of the speed of sustained rotation if this speed is very great); if the point $a$ reaches the circle corresponding to the opening lim $\alpha$ the mechanism of artificial precession comes into action and makes it describe the arc $P''r$ which brings it into the azimuth $A_z$ plus $n$ opposite to $A_z$.

The mechanical condition is that the compensating moment due to the weight, which grows proportionally to the inclination lim $\alpha$, maintains a greater speed of precession than the speed of inverse direction which would determine the disturbing moment, in such manner that the single direction of artificial precession is obtained.

Owing to the displacement $\pi$ thus obtained, on the system formed by the two elementary solids, rotor and stator, the precession imparted to one of the elements (rotor) introduces effectively an external stabilizing couple (due to the lifting) in relation to the resultant centre of gravity T of the system.

Owing to the action of the alternative disturbances, the axis of the rotor A will describe $n$ times the cone of precession.

When the disturbance ceases the deadening is effected if care is taken to place the centre of gravity G of the rotor below the point L at a distance $LG=\Sigma<0$ The resultant movement of the stator is now noted.

There has been obtained for the stator on the one hand:

$\Sigma$ displacements=0, since $$\overline{\Sigma S \sin \varphi} = o$$
$$\overline{\Sigma S \cos \varphi} \# S$$

vertical S being the lifting due to the sustained rotation of the rotor, the centre of gravity of the apparatus describing a closed curve of small radius, and on the other hand:

$$\Sigma \text{ inclinations} = 0$$

with weak oscillations;

To sum up, since the elementary stabilisation is obtained, the time $$\chi = nT = \eta \tau$$

multiple of the periods of artificial precession T and of disturbance $\tau$, can be attained without the initial movement of the stator being affected even if $n>1$, by which means the integrating movement is effectively obtained in accordance with the principle of "active stabilisation."

There will now be described, by way of example, a device performing the movement thus defined. Fig. 3 shows diagrammatically this device, comprising The motor circle $C^1$ between the two rollers $R^1$ of the stator $R^2$ of the boss, receiving the movement of the crown $U^1$ connected to the boss by reduction wheels S, with clutch, and crown $U^2$ and more generally by any mechanism which is able to transmit in the desired direction a force whose maximum is imposed, to a speed range which can also be limited. The device also includes the receiving circle $C^2$ connected to the rotor by the roller $R^3$, belonging to the surface of revolution with logarithmic meridian M;

the spherical surface of the internal synchronously rotated joint Si;

the spherical surface of the external synchronously rotated joint Se;

the centre of the synchronously rotated connection L;

the rings of the synchronously rotated connection $T^1$, $T^2$;

the driving balls B, with connecting cage, with or without guide-ring, etc.

V represents the vertical axis of the rotor and of the motor.

Cy represents the cylinder for the connection of the fuselage (called "stator") in two parts separated by the plane of the lifting auto-propelling rotor.

Fs represents the side of the upper part of the fuselage.

Fi represents the side of the lower part of the fuselage.

Y represents the boss of the rotor.

P represents a blade of the rotor.

I represents the pinion of the motor.

J represents the wheels of the reducing gear.

K represents the crown of the boss.

$R^4$ represents the permanent rolling of the internal sphere of the synchronously rotated boss on the stator.

$R^5$ represents the permanent abutment of the internal sphere of the synchronously rotated boss on the stator.

G represents the centre of gravity of the rotor.

Extension of the stabilization from the plane of rotation of the rotor to any other plane other than the horizontal plane is carried out as follows.

The axis of the cone of artificial precession, which directs the stabilisation, can be adjusted by any desired means, controlled by the pilot and/or in conjunction with all the means for the control of the flight of the aircraft; the stabilisation is then effected about each orientation of the directing axis, the margin of inclination which the axis of sustained rotation of the rotor may take in relation to the directing axis being able to assume, as desired, any value, even zero.

It will be noted that, in this connection, the axis of sustained rotation of the rotor may be connected with any other stabilization and guiding means.

This is important for stabilization during the course of flight in translation, banking, and every evolution.

By way of an example of this feature, it will be sufficient to direct the plane of the circle $C^1$ parallel to the orientation desired for the plane of sustained rotation of the rotor, by an appropriate control, either in combination or alone, and according to any rule, with any means for the control of the inclination of the rotor, for example in combination with the control by azimuthal differentiation of the characteristics of fluid currents circulating in the blades and/or leaving or returning at any points whatsoever of these.

Practically, and by way of example only, in applying the above-mentioned operation, it may be imagined that the piece carrying the driving circle $C^1$, instead of being connected axially to the crown $U^2$, is connected to it at spaced points, and moreover homokinetically; the normal axis of the circle $C^1$ being able to make, at any instant, an angle controlled at will with the axis of the crown $U^2$, in the desired azimuth, the driving in rotation being however effected as above described.

Fig. 4 shows an example of the fore-going.

It will be noticed that all the processes described may be employed alone or in combination with all systems, automatic or controlled, of any amplitude, positive or negative, (adjustable or reversible speeds) for the variation of the pitch of the blades of the lifting, lifting and auto-propelling or propelling system. Now every system for the variation of the pitch can be resolved into two elementary kinematic systems in engagement, the first in connection with the stator, the second in connection with the rotor.

It will therefore suffice, for example, to give to the first system a degree of freedom of movement (in relation to the stator) such that the movement of variation of the pitch is possible, irrespective of the orientation of the axis of the rotor, this being effected by point-wise connection, preferably synchronously rotated, of the axis of symmetry of the first system to an axis of the stator, with the motor axis, in such a manner that the axis of symmetry of the first system of drive may coincide substantially with the axis of rotation of the rotor, irrespective of the orientation of this latter. The centre of connection being any point, variable or invariable, at will, preferably the very centre of the synchronously rotated joint of the rotor to the stator, and the axis of symmetry of the first system moreover may or may not be movable along its own direction.

The pilot can control the first system by means of any mechanism. The patent of addition No. 36,097 of the 5th October 1936 elaborates the invention by the utilization of gears with primitives of variable curvature, especially a logarithmic spiral, so that in reference to any position determined in relation to the system of reference connected to the stator of the control of any mechanism for the variation of pitch, placed at the disposal of the pilot, there will be a corresponding angular position, and one only, of the blades, and therefore of the pitch of these latter in relation to the system of reference connected to the rotor, the movement of the rotor in relation to the stator being fixed.

In Fig. 4, PV represents such a device, while Fig. 5 shows an enlarged section of the device PV.

For the purpose of applying the features in practice, it will also be noticed that the pointwise connection, preferably synchronously rotated, whether or not in combination with the process of "active" stabilization, and all processes described herein, also whether or not in combination with any means of control, especially of variation of pitch of screw, and likewise combined or not combined with any blowing or suction of fluids on the profile of the blades creating hypertraction, may be applied in a permanent manner or otherwise to the propellers of all mobile craft in all environments, especially to aircraft with static lifting devices, such as, to aircraft without sustained relative movement of the lifting device in relation to the fuselage, for example to aeroplanes, so as to increase their qualities, or their performances, their manoeuvrability, their stability and principally their resistance (owing to the reduction of the strains and vibrations of all kinds, for example of gyroscopic nature, caused by the present method of permanent axial connection between the propeller and the rest of the aircraft; the direction of the axis of the screw being moreover automatic or controlled, by any system of whatever nature (mechanical, fluid, electrical, etc.).

The means of control above described may be applied to all mobile craft in all fluids, for the purpose of particularly improving the propulsion, the braking and the performance of land or marine mobile craft.

These control means especially involve the application of adjustable hyper-propelling and/or braking systems (by blowing, suction, etc. of fluids on the profile of the blades) to moving land craft so as to permit:

(a) a greater pulling and braking force,
(b) orientation in any points of space,
(c) the removal of the necessity for adhesion, thus permitting greater speeds and accelerations.

Said control means also involve the application of the same systems to mobile marine and submarine craft.

The present invention may be used in connection with all crafts operating in any fluid, regardless of the speed under which said crafts are operating.

Having now fully described our invention, we claim:

1. In an aircraft, a main body member, a rotating lifting mechanism universally mounted in the body member and having a geometrical axis of alterable rotation, driving means for said lifting mechanism comprising a rotating hub rotatable about a fixed geometrical axis, and driving means for imposing on the geometrical axis of rotation of the lifting mechanism a conical motion about the geometrical axis of rotation of the hub when the angle formed by said geometrical axes attains a predetermined value.

2. In an aircraft, a main body member, a lifting mechanism, a rotating driving hub, means for universally mounting the lifting mechanism on the driving hub and for simultaneously transmitting to the lifting mechanism the rotation of the driving hub, and driving means for imposing on the lifting mechanism, in addition to its rotation, a conical motion about the driving means when the relative inclination of said mechanism and of said hub attains a fixed value.

3. In an aircraft, a main body member, a lifting mechanism, a rotating driving means for universally mounting the lifting mechanism on the driving means and for simultaneously transmitting to the lifting mechanism the rotation of the driving means with the same instantaneous velocity, and means for imposing on the lifting mechanism, in addition to its rotation, a conical motion about the driving hub when the relative inclination of said mechanism and of said hub attains a fixed value.

4. In an aircraft, a main body member, a lifting mechanism, a rotating driving hub means for universally mounting the lifting mechanism on the driving hub, and for simultaneously transmitting to the lifting mechanism the rotation of the driving hub with the same instantaneous velocity, the center of gravity of the lifting mechanism being situated below the center of the universal mounting thereof, and means for imposing on the lifting mechanism in addition to the rotation, a conical motion about the driving hub when the relative inclination of said mechanism and of said hub attains a fixed value.

5. In an aircraft, a main member body, a lifting mechanism, a rotating driving hub, means for universally mounting the lifting mechanism on the driving hub, and for simultaneously transmitting to the lifting mechanism the rotation of the driving hub, a crown member freely and coaxially mounted in the lifting mechanism, a corresponding crown member mounted in the main body member coaxially with the rotating driving hub, the two crown members being adapted to mesh and cooperate with each other when the relative inclination of the lifting mechanism and the driving hub attains a fixed value, and means for imposing a driving motion on the crown member mounted in the main body member.

6. In an aircraft, a main body member, a simultaneous lifting and propelling system, a rotating motor hub, means for mounting the lifting and propelling system on the motor hub universally and for positive rotation therewith so as to transmit directly the rotation of the motor hub at the same velocity thereof to the lifting system and means for impressing on the geometrical axis of rotation of the lifting and propelling system in addition to said rotation a conical motion about another geometrical axis which is capable of being oriented with respect to the geometrical axis of rotation of the motor hub, when the angle formed by the first two geometrical axes attains a predetermined value.

7. In a moving body in an ambient fluid, a main body member, a rotating propelling system mounted universally in said main body member and having a shiftable geometrical axis of rotation, a first motor means for said system comprising a rotating hub having a fixed geometrical axis of rotation, and a second motor means for impressing on said shiftable geometrical axis of rotation of the propelling system a conical motion about the geometrical axis of rotation of the motor hub when the angle formed by said two geometrical axes attains a predetermined value.

8. In a moving body in an ambient fluid, a main body member, a propelling system, a rotating motor hub, means for mounting the propelling system on the motor hub universally and for positive rotation therewith, so as to transmit directly the rotation of the motor hub at the same velocity thereof to the propelling system, and means for impressing on the geometrical axis of rotation of said propelling system, in addition to the rotation imparted, also a conical motion about the geometrical axis of rotation of the motor hub when the angle formed by said two geometrical axes attains a predetermined value.

9. In a moving body in an ambient fluid, a main body member, a propelling system, a rotating motor hub, means for mounting the propelling system on the motor hub universally and for positive rotation therewith so as to transmit directly to the propelling system the rotation of the motor hub at the same velocity thereof, and means for impressing on the geometrical axis of rotation of the propelling system, in addition to the rotation imparted, also a conical motion about another distinct geometrical axis of rotation which is capable of being oriented with respect to the geometrical axis of rotation of the motor hub when the angle formed by the first two geometrical axes attains a predetermined value.

WILLIAM ARTHUR LOTH.
SÉBASTIENNE MARIE HENRIETTE GUYOT.